United States Patent
Scott et al.

(10) Patent No.: US 10,759,052 B2
(45) Date of Patent: Sep. 1, 2020

(54) METHOD AND APPARATUS FOR ROBOTIC LAUNCH AND CAPTURE OF A UAV

(71) Applicant: The Government of the United States of America, as represented by the Secretary of the Navy, Arlington, VA (US)

(72) Inventors: Gregory P. Scott, Washington, DC (US); Andrew Bolkhovitinov, Reston, VA (US)

(73) Assignee: The Government of the United States of America, as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 16/049,417

(22) Filed: Jul. 30, 2018

(65) Prior Publication Data

US 2019/0126478 A1 May 2, 2019

Related U.S. Application Data

(60) Provisional application No. 62/538,419, filed on Jul. 28, 2017.

(51) Int. Cl.
*B64F 1/04* (2006.01)
*B25J 9/16* (2006.01)
*B25J 15/06* (2006.01)
*B64F 1/22* (2006.01)
*B64F 1/02* (2006.01)

(52) U.S. Cl.
CPC ........... *B25J 9/1664* (2013.01); *B25J 9/1679* (2013.01); *B25J 15/0608* (2013.01); *B64F 1/02* (2013.01); *B64F 1/04* (2013.01); *B64F 1/22* (2013.01); *B64C 2201/08* (2013.01); *B64C 2201/182* (2013.01)

(58) Field of Classification Search
CPC .... B25J 9/1664; B25J 9/1679; B25J 15/0608; B64F 1/04; B64F 1/22
USPC ..... 700/250; 701/3, 4, 11, 16; 244/63, 76 R, 244/195
See application file for complete search history.

(56) References Cited

U.S. PATENT DOCUMENTS

| | | | | |
|---|---|---|---|---|
| 9,505,493 | B2* | 11/2016 | Borko | B64C 39/024 |
| 2006/0249622 | A1* | 11/2006 | Steele | B64F 1/02 |
| | | | | 244/115 |
| 2019/0025858 | A1* | 1/2019 | Bar-Nahum | G08G 5/0078 |

* cited by examiner

*Primary Examiner* — Dalena Tran
(74) *Attorney, Agent, or Firm* — US Naval Research Laboratory; Richard Bis

(57) ABSTRACT

An apparatus and system for launching and/or capturing an unmanned aerial vehicle (UAV). The apparatus includes a moving substrate having an electromagnetic end effector and a UAV with a metallic strike plate to be attracted to the end effector when the electromagnet is activated. The system includes a movable robotic arm having a free end and a secured end; an electromagnetic end effector connected proximate to the free end of the robotic arm; a UAV with a metallic strike to be attracted and held to the electromagnetic end effector when the electromagnetic end effector is active; trajectory software configured to control a location of the free end of the robotic arm; and a control module for receiving input data, analyzing the data and using the trajectory software to control the location of and activate or deactivate the electromagnetic end effector. Also described are methods for launching and capturing the UAV.

14 Claims, 16 Drawing Sheets
(16 of 16 Drawing Sheet(s) Filed in Color)

METHOD AND APPARATUS FOR ROBOTIC LAUNCH AND CAPTURE OF A UAV

CROSS-REFERENCE TO RELATED APPLICATIONS

This application claims the benefit of the filing date of U.S. provisional application No. 62/538,419, filed on Jul. 28, 2017, the teachings of which are incorporated herein by reference in their entirety.

TECHNICAL FIELD

A robotic launch and capture apparatus and system for use with unmanned aerial vehicles (UAV). The apparatus utilizes an electromagnetic compliant end effector connected to a robotic arm. Also described are methods of controlling the robotic arm to effect launch and capture.

BACKGROUND

In the past decade, Unmanned Aerial Vehicles (UAVs) have become an increasingly crucial facet of many Department of Defense (DoD) operations, due to their versatile and reliable defensive and surveillance capabilities. The DoD currently utilizes several different types of UAVs, with many different capabilities. The smaller systems, referred to as Tier 1 UAVs, primarily perform low-altitude tasks. Tier 1 UAVs range from three to five kilograms in weight. The larger systems, Tiers 2 & 3 perform high-altitude tasks and weight over ten to hundreds of kilograms. Even though all of these UAVs are extremely versatile and autonomous once they are airborne, virtually all of these aerial systems require direct human involvement during launch. The lighter, Tier 1 systems are usually launched by hand, while the heavier Tier 2 & 3 systems are launched using large pneumatic or elastic catapults, which often require two or more personnel to set up and reload after each launch. The UAV launch systems currently used lack two crucial characteristics: autonomy and repeatability.

The current state-of-the-art systems in non-runway UAV capture have two crucial problems. The broad capture mechanism of these UAV capture systems is a net and a snag-wire, respectively. Net capture systems typically consist of a large rectangular surface of webbing, supported upright by an external structure. While the net system allows UAV capture without a runway, the deceleration of the UAV is uncontrollable, leading to stresses on the structure of the vehicle. Additionally, the generally massive size of the system leads to the possibility of entanglement.

Snag-wire capture systems consist of a wire suspended by a crane. A small hook attached to a wing of the UAV snags the wire, causing the UAV to quickly decelerate and spiral erratically around the wire. Similar to the net system, the snag-wire system requires multiple personnel to function, and can cause signification stress on the UAV. The two main problems with the current UAV capture systems are the lack of autonomy and lack of controlled deceleration.

Current UAV launch systems are either human powered or require on-site human involvement for operation. UAV launch from a robotic arm system would permit UAV deployment and capture to be both autonomous and repeatable, providing a safer, faster, and more reliable launch system. A robotic arm UAV capture system has the potential to provide both autonomous and repeatable capture, as well as controlled deceleration to minimize UAV stress.

SUMMARY OF THE INVENTION

The present disclosure relates to an apparatus and system for launching and/or capturing a UAV. The disclosure is also related to methods of launching or capturing a UAV.

One embodiment of the invention relates to an apparatus for capturing an unmanned aerial vehicle. The apparatus comprises a moving substrate, an electromagnetic end effector connected to the moving substrate, and a metallic strike plate located on the unmanned aerial vehicle and configured to be attracted and securely held to the electromagnetic end effector when the electromagnetic end effector is activated.

In the forgoing embodiment, the moving substrate is configured to provide a desired orientation and velocity of the electromagnetic end effector, preferably the moving substrate is a robotic arm.

In each of the forgoing embodiments the apparatus may also comprise a data collection module for collection of motion data of the unmanned aerial vehicle, a data analysis and computation module for determining a future path of the UAV from the motion data collected by the data collection module and constructing a trajectory path for the electromagnetic end effector using said future path of the UAV, and a communication module for communicating said constructed trajectory path to the robotic arm for execution.

Another embodiment of the invention describes a system for launching and/or capturing an unmanned aerial vehicle. The system comprises a movable robotic arm having a free end and a secured end, an electromagnetic end effector connected proximate to the free end of the robotic arm, a metallic strike plate located on the unmanned aerial vehicle to be attracted and securely held to the electromagnetic end effector when the electromagnetic end effector is active, trajectory software configured to control a location of the free end of the robotic arm, and a control module for receiving input data, analyzing the data and using the trajectory software to control the location of the free end of the robotic arm and activate or deactivate the electromagnetic end effector.

In each of the forgoing embodiments, the electromagnetic end effector further comprises at least one aligning rail positioned and configured for aligning the unmanned aerial vehicle in a particular orientation relative to the electromagnetic end effector.

The system of the above embodiment may also comprise a data collection module for collection of motion data of the unmanned aerial vehicle and communicating said motion data to said control module. The control module determines a future path of the UAV from the motion data collected by the data collection module and constructs a trajectory path for the electromagnetic end effector using said future path of the UAV, and the system may also comprise a communication module for communicating said constructed trajectory path to the robotic arm for execution.

Each of the forgoing embodiments may further comprise an actuator configured for activating and deactivating an electromagnet of the electromagnetic end effector. The control module is configured to cause the actuator to deactivate the electromagnet at a launch time when said UAV has achieved a sufficient velocity and is positioned at suitable launch angle.

Another embodiment of the invention is a method of capturing an unmanned aerial vehicle provided with a metallic strike plate, said method comprising steps of: directing the unmanned aerial vehicle on a path that intersects a work envelope of a robotic arm comprising a free end and a secured end, and an electromagnetic end effector located proximate to the free end of the robotic arm, obtaining motion data for the unmanned aerial vehicle, and controlling a location of the free end of the robotic arm based on the motion data to position the electromagnetic end effector for interaction with the metallic strike plate of the unmanned aerial vehicle when the unmanned aerial vehicle is present within the work envelope of the robotic arm to capture the unmanned aerial vehicle.

In the forgoing method, the step of controlling a location of the free end of the robotic arm comprises a step of determining a future path of the UAV from the motion data, and the controlling step further comprises a step of constructing a trajectory path for the end effector using the future path of the UAV.

In each of the forgoing embodiment the trajectory path is a point-to-point trajectory path, preferably, the point-to-point trajectory path is a point-to-point trajectory path with a reference point.

In each of the forgoing embodiments, the constructed trajectory path includes a start time at which movement along said constructed trajectory path is initiated.

Additional details and advantages of the disclosure will be set forth in part in the description which follows, and/or may be learned by practice of the disclosure. The details and advantages of the disclosure may be realized and attained by means of the elements and combinations particularly pointed out in the appended claims. It is to be understood that both the foregoing general description and the following detailed description are exemplary and explanatory only and are not restrictive of the disclosure, as claimed.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

The present invention relates to a UAV launch and/or capture system that can provide autonomous launch, capture, and recharge of UAVs. The system for robotic launch and/or capture of UAVs utilizes an electromagnetic end effector.

Also disclosed is a method of launching a UAV that can be carried out using the UAV launch and/or capture system, as well as a data capture, processing and execution method suitable for execution of the method to capture a UAV using the system.

In order for a UAV to be successfully launched, the launch mechanism must ensure that the UAV attains a certain launch velocity and must position the UAV at a suitable launch angle at the moment of release to generate enough lift and momentum for the onboard motor system of the UAV to successfully take over control and maintain the UAV in flight.

Figure 1:
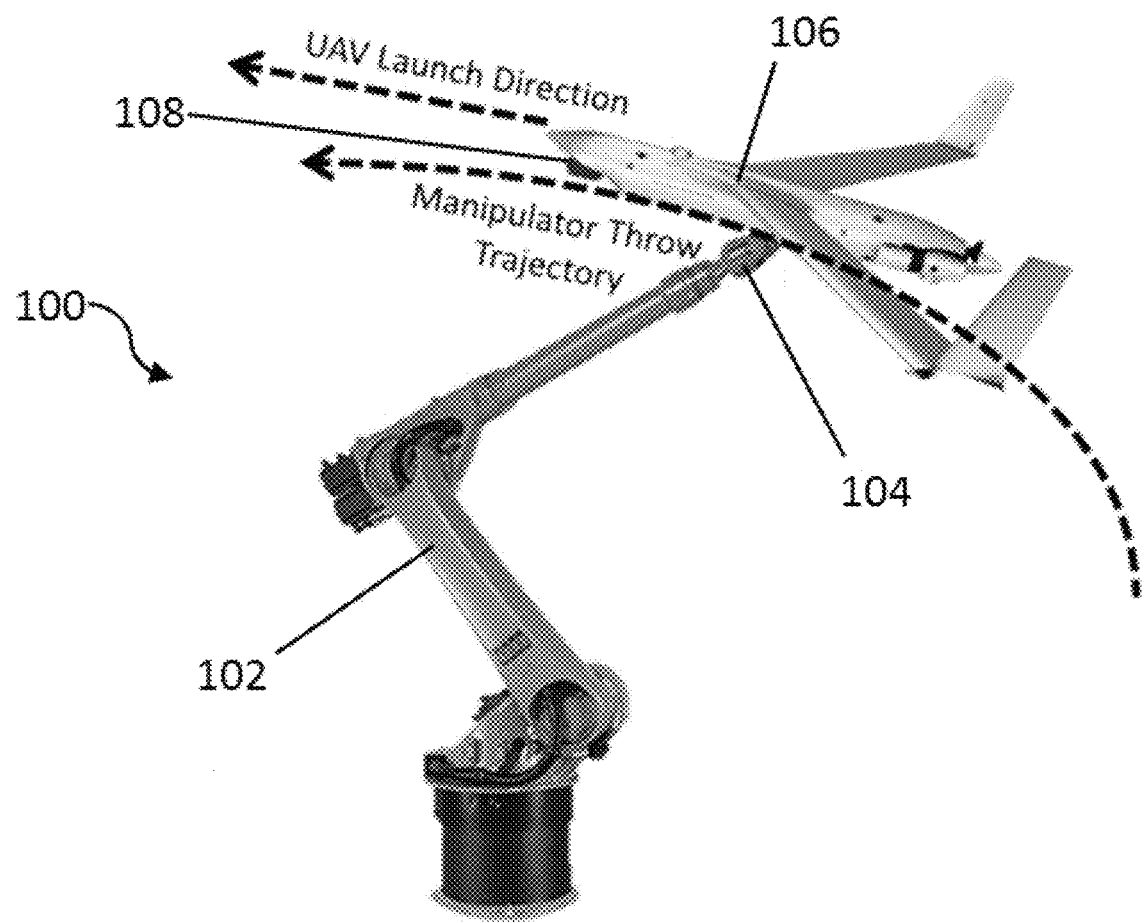
FIG. 1 is a diagram of a robotic system according to an embodiment of the invention as used to launch a UAV.

The general premise of the throwing mechanics of the UAV system utilizing a robotic arm is shown in FIG. 1. In order for the robotic arm to launch a UAV, the arm first accelerates the UAV to its required launch velocity and at the same time positions the UAV at a suitable launch angle using a programmed trajectory path. The compliant end effector is caused to release the UAV system at the desired moment of launch, and the UAV is launched from the robotic arm.

Figure 2:
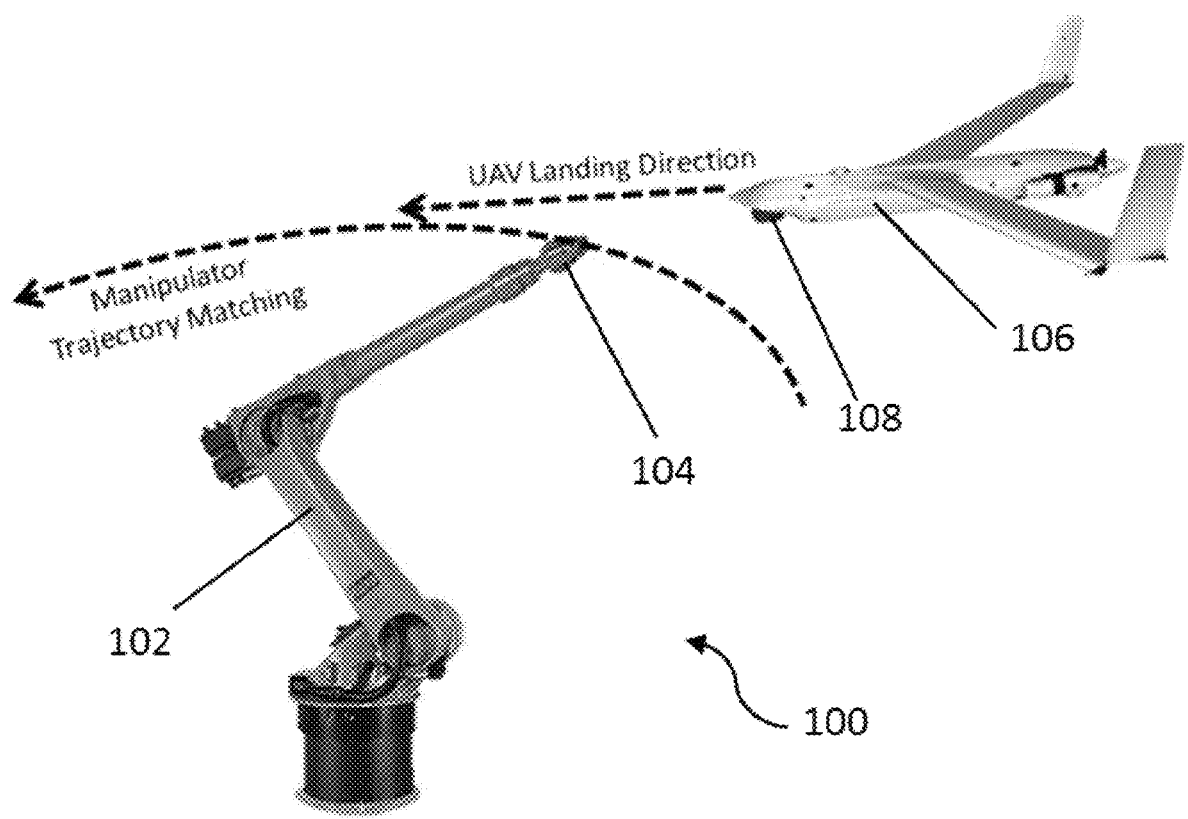
FIG. 2 is a diagram of a robotic system according to an embodiment of the invention as used to capture a UAV.

Use of a robotic UAV capture system decreases the required space, set up time, human interaction, and physical stress on a UAV during capture. The general premise of the capture mechanics of a UAV system utilizing a robotic arm is shown in FIG. 2. In order to perform successful UAV capture, the capture system requires data collection and analysis and a communication module to cause execution of commands based on the analyzed data. The capture system must be able to obtain raw data representative of the motion of the UAV to be captured. Software, such as the MATLAB script used in one embodiment of the invention, is able to process the raw motion data to extrapolate a flight path of the UAV, and calculate a smooth Cartesian end-effector catch path, which can be used to manipulate the robotic arm to cause motion of the end effector to match the desired catch path with proper timing and orientation for capture of the UAV.

UAV Launch and Capture System

The robotic launch and/or capture apparatus 100 shown in FIGS. 1 and 2 utilizes a moving substrate 102 shown as the preferable robotic arm and an end effector 104 attached proximate to a free end of robotic arm 102 to launch and/or capture a UAV 106. To launch a UAV using the apparatus of FIG. 1, a strike plate 108, which is configured for interaction with end effector 104 is attached to, or forms a part of UAV 106. Using strike plate 108, UAV 106 is secured to end effector 104 that, in turn, is affixed to robotic arm 102 of robotic launch and/or capture system 100. To launch UAV 106, trajectory software of a control module causes robotic arm 102 to move in a manner which accelerates UAV 106 to a desired launch velocity and positions UAV 106 at a suitable launch angle. When UAV 106 reaches launch velocity and is positioned at a suitable launch angle, the control module communicates with end effector 104 to cause end effector 104 to release UAV 106 thereby launching UAV 106.

To capture UAV 106 using the launch and/or capture system as shown in FIG. 2, raw motion data of an incoming UAV 106 is collected by the system. The motion data is analyzed using software of the control module to construct a smooth catch path for end effector 104. The control module then controls robotic arm 102 to position end effector 104 and cause end effector 104 to follow the constructed catch path at the appropriate time. The control module also activates the end effector at the correct time during capture to attract the UAV. Preferably, when end effector 104 is initially positioned proximate to the beginning of the constructed catch path, an electromagnet on end effector 104 is active for attracting and securing UAV 106 to end effector 104, thereby resulting in capture of UAV 106.

The end effector 104 is a mechanism positioned proximate to the free end of robotic arm 102. End effector 104 includes suitable apparatus for influencing its surrounding environment, for example, an electromagnet for creating a magnetic field in the environment surrounding end effector 104. End effector 104 may also include any other mechanical mechanism that is capable of securely holding the UAV and releasing the UAV at the desired launch angle and speed for launch, and is also capable of securing the UAV upon capture. The end effector has three design characteristics, it is stable, non-intrusive, and preferably bi-directional, meaning it can be used for both launching the UAV and for recovering the UAV.

In some embodiments, the system for capturing and/or launching a UAV includes a tool, or end effector 104 that is mountable to a flange of robotic arm 102. End effector 104 is capable of holding and releasing UAV 106 on command, and is preferably an electromagnetic end effector. The system may include an actuator configured for activating and deactivating the end effector, preferably the electromagnet of the electromagnetic end effector. The control module causes the actuator to deactivate the electromagnet at a launch time when said UAV has achieved a sufficient velocity and is positioned at suitable launch angle.

In one embodiment for use with Tier 1 UAVs, the end effector 104 is under the payload limit of about 3 kg, and lightweight robots (LWR) are used. LWR have a payload limit of 7 kg. The weight limit for end effector 104 is reduced to account for the additional weight of UAV 106 so that it can be located on robotic arm 102 during deployment. Other robotic arms having higher payloads can be used in this system. With the use of such robotic arms, larger UAVs, and an increase in the weight of the end effector 104 can be tolerated.

A preferable end effector design utilizes an electromagnet to achieve the three characteristics of the end effector, namely, stable, non-intrusive, and bi-directional. In one embodiment wherein a Tier 1 UAV is being utilized, a 1.5" 6V electromagnet may be used as part of the end effector. The end effector also preferably comprises an alignment device used to maintain the alignment of the UAV in a single direction during launch and recovery. Preferably, this alignment device includes two aligned fuselage rails.

Figure 3:
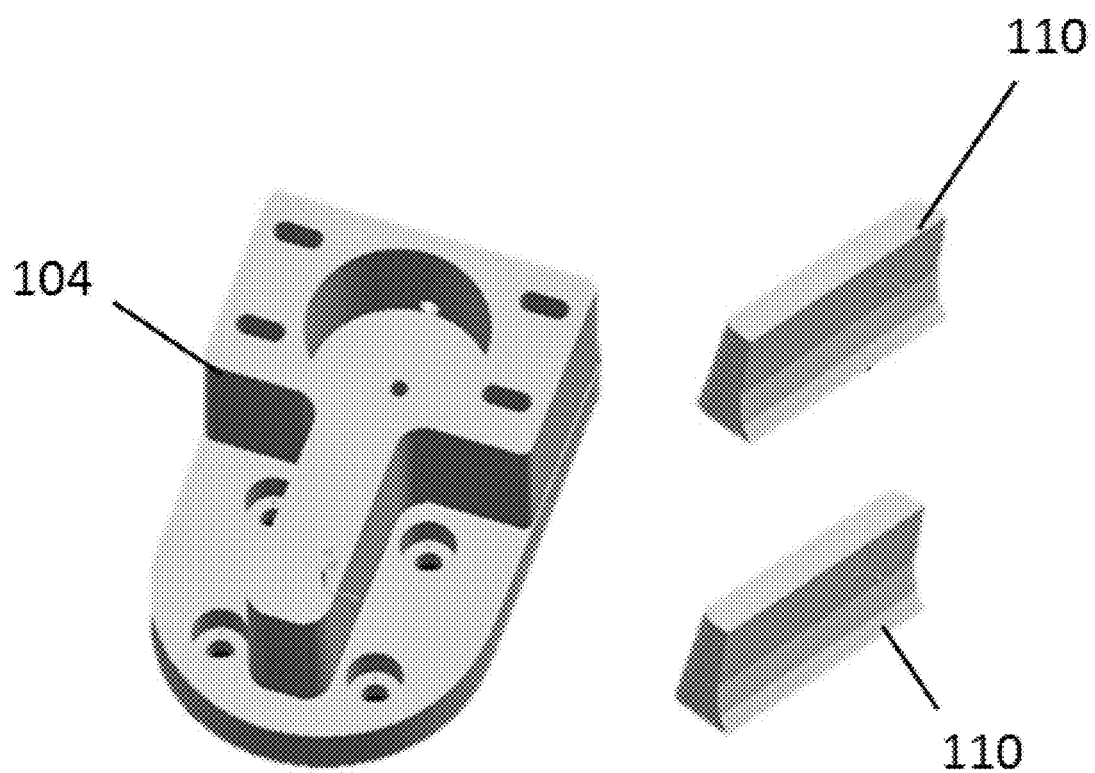
FIG. 3 is a computer rendering of an embodiment of an end effector and fuselage rails according to an embodiment of the invention.
Figure 4:
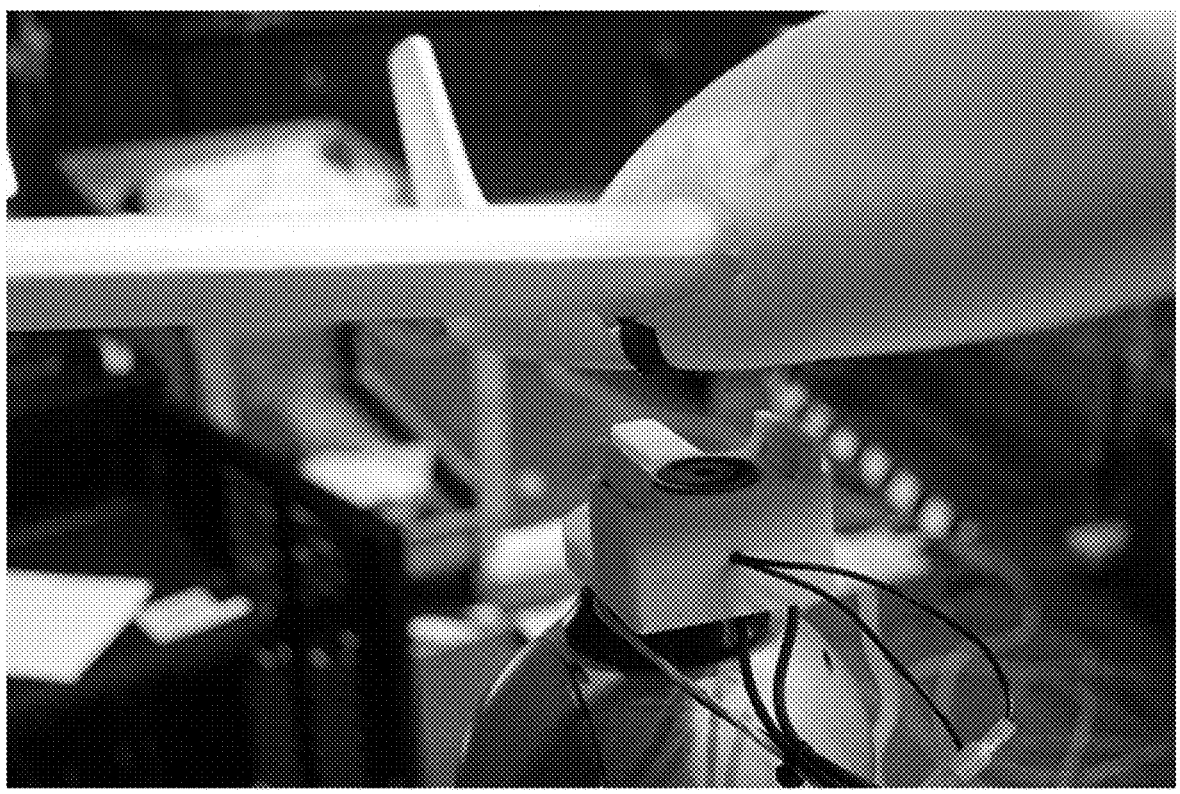
FIG. 4 is a picture of a fuselage of a UAV aligned with an end effector.
Figure 18:
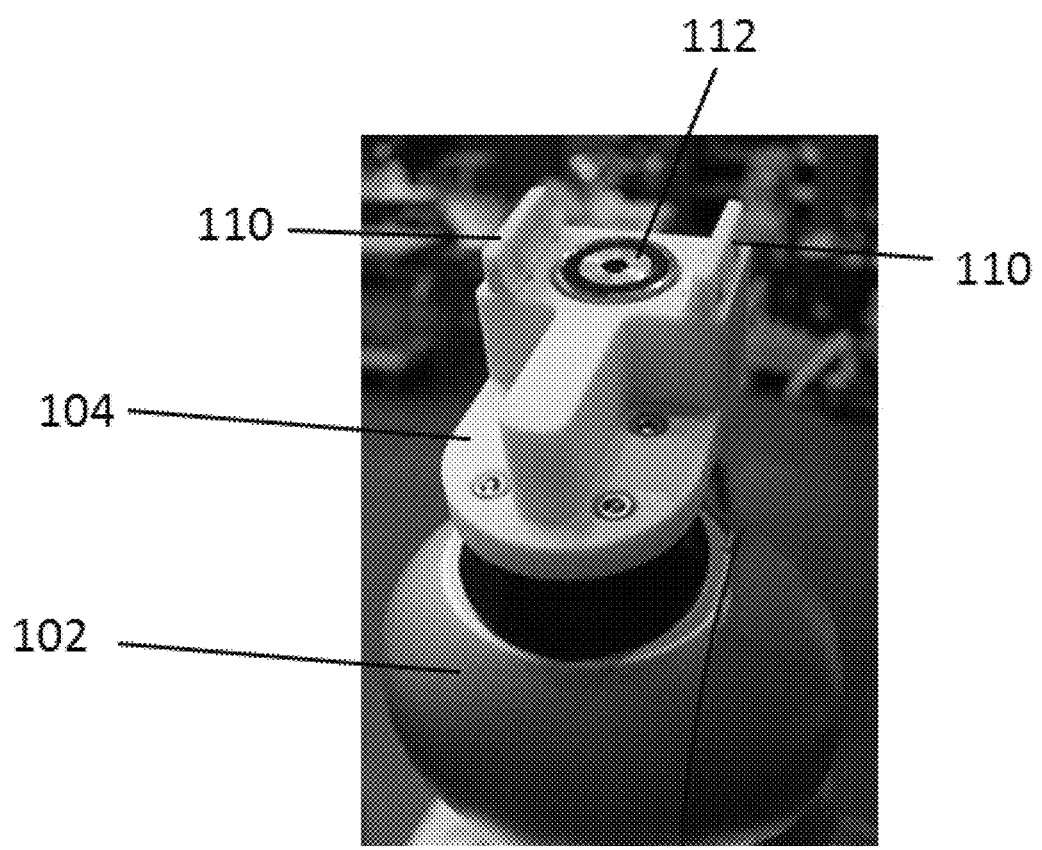
FIG. 18 is a picture of an embodiment of an end effector attached to a moving substrate.

FIG. 3 shows an embodiment of a mechanical design for the end effector 104, and FIG. 18 is a picture of an end effector comprising an electromagnet 112 attached to a robotic arm according to an embodiment of the invention. In this embodiment, the end effector 104 is configured for use with a KUKA LWR 4+ robotic arm and a Tier 1 UAV. The end effector 104 securely anchors an electromagnet to the flange of the LWR using four M6 mount screws. The 1.5" (not shown) electromagnet is fastened into the end effector 104 using a 10×32 bolt threaded into the body of the end effector. Two aligning fuselage rails 110 serve to ensure UAV alignment during deployment. Each of the two curved rails are screwed into a slot located on each side of the electromagnet, in order to allow the fuselage of the UAV to align itself with the end effector 104 such that the front of the UAV is facing the same direction throughout the entire deployment. As shown in FIG. 4, although any alignment device may be used for this purpose, the use of two removable aligning fuselage rails adds a level of adjustability to the system, which allows different types of UAV systems to be deployed with one configuration of end effector 104 by changing either the location of fuselage rails, or exchanging the fuselage rail units for different size alignment units.

Since most UAV systems have fuselages constructed of fiberglass or carbon fiber, direct contact between an electromagnet and the body of the UAV will not provide a sturdy connection. To solve this problem, a metallic strike plate is attached to the UAV, preferably on a bottom surface thereof, in order to provide a magnetic surface for the electromagnet to interact with. The metallic strike plate is configured to be attracted and securely held to the electromagnet end effector when the electromagnet is activated. In the preferred embodiment discussed above, a 1.5"×2.5" steel strike plate is attached to the bottom of the UAV. The addition of a strike plate is not necessary if the UAV itself is made from a metallic material or comprises a sufficiently large portion of metallic material to provide a minimum level of interaction with the electromagnet of the end effector.

Moving Substrate

Figure 5:
FIG. 5 is a depiction of a robotic arm used in one embodiment.

Any device that can be configured to move in a specified direction can be used as the moving substrate. The moving substrate is configured to provide a desired orientation and velocity of the electromagnetic end effector. Preferably, the moving substrate is a robotic arm, but could include other movable items, such as a car, ship, truck, train, airplane or another UAV. When a robotic arm is used, any robotic arm that is capable of being programmed to move in a specific direction and speed, and hold at least the weight of the UAV can be used in the present apparatus and system. In one embodiment the KUKA Lightweight Robot (LWR) 4+ shown in FIG. 5 is employed. Larger robotic arms, such as the KR 20-3 can also be used with their corresponding robotic control systems and programming language to perform similar movements as described herein. The LWR is a 7-degree-of freedom robotic arm capable of manipulating a payload of up to 7 kg (15.4 lbs.). Each of the joints on the LWR are controlled using a communication module, which in this case is the KUKA Robot Control (KRC) teach pendent, which is a custom Windows®-based software interface that is capable of accurately adjusting each joint with a ±0.1 mm accuracy. The KRC uses a programming language called KUKA Robot Language (KRL) to send motion and information commands to and from the LWR. The throw trajectory software for the present system may be programmed in KRL for use by the KRC.

Three specific types of commands are used for the trajectory software: motion commands, data retrieval commands, and serial communication commands. Motion control allows the KUKA robotic arm to move relative to its surroundings. The LWR moves using three types of movements: PTP (Point to point movement), LIN (Linear movement), and CIRC (Circular movement). In the programming in the preferred embodiment of the present system, two motion commands employing PTP and LIN motion account for the majority of the motion of the robotic arm. Both PTP and LIN motion have their positives and negatives, all of which were considered when programming the throw trajectories for the present system.

Figure 6:
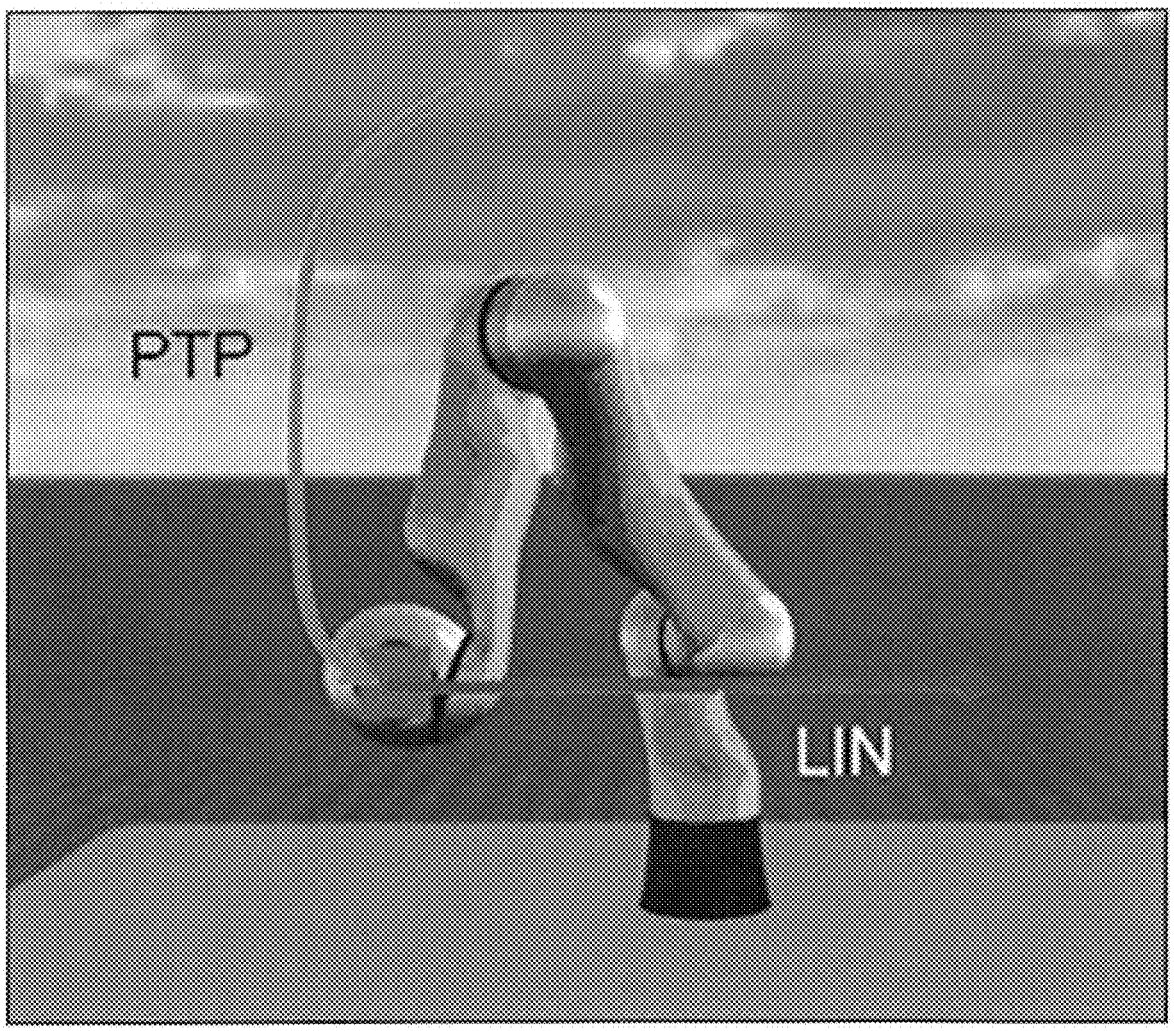
FIG. 6 is a depiction of a robotic arm showing two different types of motion.

PTP motion has a high path speed and low path accuracy, whereas LIN motion has a low path speed and high path accuracy. In FIG. 6, a visual comparison between PTP and LIN motion can be seen. The green PTP motion shows a fast, albeit curved motion between two points, while the red LIN motion shows a slower, yet perfectly straight motion between two points. The throw trajectories developed using KRL for one embodiment of the present system are described in more detail below use LIN and PTP motion.

Another KRL feature used in the described embodiment of the present system was data retrieval. While the LWR performs certain KRL motion commands, a multitude of variables are calculated, each pertaining to different mechanical and electrical characteristics of the robotic arm at any point in time. The two KRL variables that were stored during throw trajectory testing are displayed in Table 1.

TABLE 1

| Variable Name | Description | Abbreviated Variable Name |
|---|---|---|
| $POS_ACT.C | Value of the angle of elevation of the end effector, in degrees | C |
| $VEL_ACT | Value of the angle of elevation of the end effector, in degrees | V |

Within the KRL software, the C and V variables represent the end effector's angle of elevation and velocity, respectively. Both of these variables are recorded during the throw trajectory using an oscilloscope provided within the KRC, and the C and V values recorded throughout the duration of each trajectory motion are stored.

The third KRL command utilized for the interface is serial communication. A communication module preferably uses the third KRL command for communication of the constructed trajectory path to the robotic arm for execution. In order for the LWR to communicate with the end effector, a command is outputted by the KRC, and the end effector responds accordingly. The KRL commands CWRITE and CREAD were used to communicate between the LWR and an Arduino microprocessor to control the end effector in the described embodiment.

UAV Launch

The task of successfully deploying a UAV from the robotic arm requires that the compliant end effector and the robotic arm work in unison to ensure that the UAV is released at a desired launch velocity and suitable launch angle. As such, there are three components of an effective UAV-deploying system: 1.) the compliant robotic end effector, 2.) the control module for using the trajectory software for the robotic controller, and 3.) a communication module as an interface between the end effector and the trajectory software used by the control module.

The compliant robotic end effector includes a mechanical and electrical system capable of quickly capturing and releasing the UAV on command to ensure that the UAV is reliably released at the moment of launch, as discussed in detail above. Preferably, the end effector is a magnetic grip end effector. The trajectory software for the robotic controller is configured to ensure that the robotic arm moves in a desired constructed path at a certain speed to ensure that the UAV system is launched at the required launch velocity and a suitable launch angle at the moment of launch. The interface between the end effector and the trajectory software of the control module is adapted to ensure that the end effector and the trajectory software quickly and accurately communicate to ensure proper timing for the acceleration, positioning and release of the UAV during launch.

Trajectory Software

The trajectory software can be developed using the control module and programming language for the specific moving substrate, preferably a robotic arm that is utilized in the system. The primary objective is to create a program capable of accelerating the end effector and UAV on the LWR to a required velocity and at the same time position the UAV at a suitable launch angle for deployment. In one embodiment, the two KRL motion commands that were used within the throw trajectory programs were Point-to-Point (PTP) and Linear (LIN) motion commands. Although any path type resulting in a suitable launch angle and launch velocity for the UAV can be used, in one embodiment, three different trajectory path types were programmed on the KRC. Each trajectory path type utilized different aspects of PTP or LIN motion. Each trajectory path type is described with a diagram shown in the figures. The red vectors represent the orientation of the UAV at each point.

Figure 7:
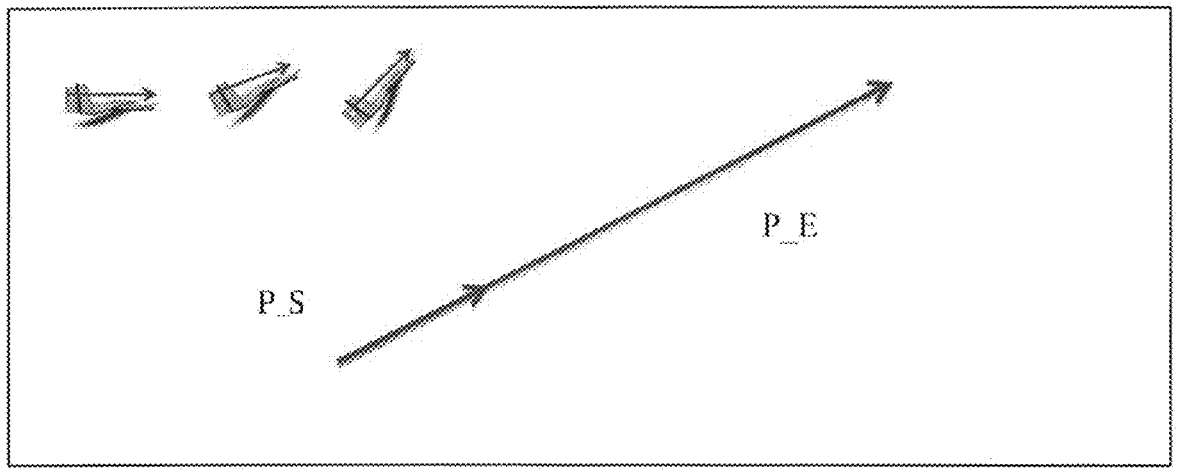
FIG. 7 is a diagram of a linear trajectory path type.

1: Linear Trajectory is shown in FIG. 7—This trajectory utilizes a linear motion from a start point (P_S) to an end point (P_E). The orientation of the end effector is programmed to stay constant, thus the angle of elevation is also kept constant. The path length is short due to restrictions in the work envelope of the LWR.

Figure 8:
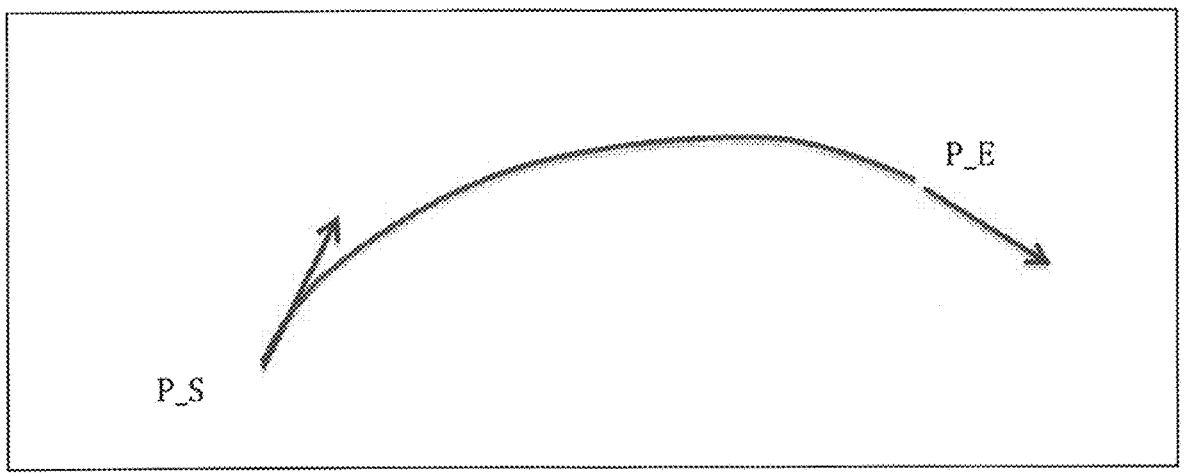
FIG. 8 is a diagram of a point-to-point trajectory without a reference point path type.

2: PTP Trajectory (No Reference Point) is shown in FIG. 8—This trajectory utilizes a point-to-point motion from a start point (P_S) to an end point (P_E). The orientation of the end effector is programmed to change during the motion. Thus, the angle of elevation also changes during the motion. The path length is longer than the linear motion of FIG. 7 because this path is curved.

Figure 9:
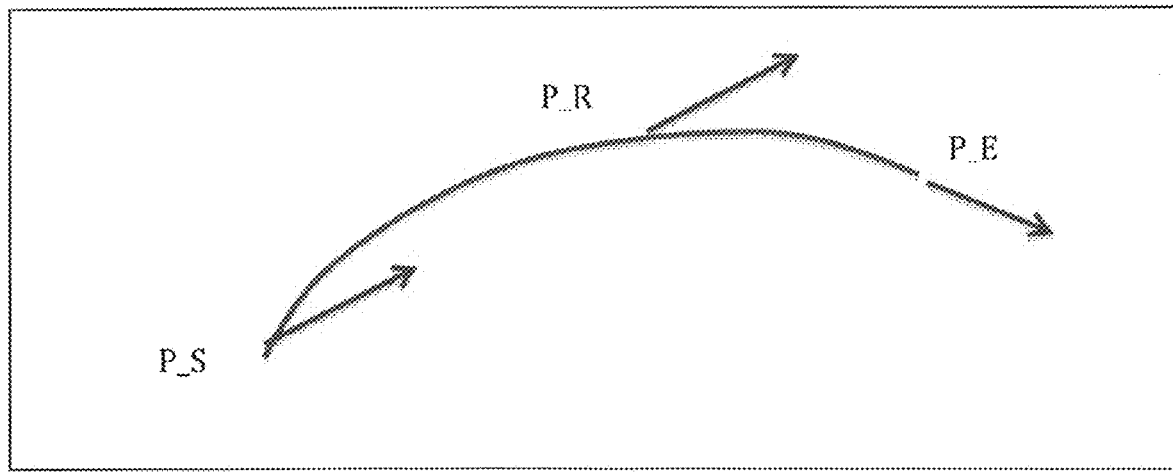
FIG. 9 is a diagram of a point-to-point trajectory with a reference point path type.

3: PTP Trajectory (With Reference Point) is shown in FIG. 9—This trajectory utilizes a point-to-point motion from a start point (P_S), to a middle reference point (P_R), and then to an end point (P_E). The orientation of the end effector is kept constant between the start point and the reference point. The path length is also long because it is curved.

A control module uses the trajectory software to determine the future path of the UAV, and can utilize any of the trajectory paths described above, or a different path that utilizes different known commands to control the motion of the moving substrate. The constructed trajectory path includes a start time at which movement along the constructed trajectory path is initiated.

Release Timing Interface

In the preferred embodiment, for the end effector to respond quickly and efficiently to commands sent through the trajectory software of the robotic arm, a robotic arm controller termed the "Release Timing Interface (RTI)" was designed for providing communication between the trajectory software and the end effector. One objective of the RTI was to provide an electronic system capable of interpreting serial commands of the robotic arm controller to control an actuator used to activate or deactivate the electromagnet of the end effector. The serial commands may be obtained from a control module of a robotic arm, or a data analysis and computation module. Since interpreting serial commands from the KRC requires computation, an Arduino microprocessor board was used along with a serial port shield to interpret the serial signal. The 1.5" electromagnet used on the magnetic grip end effector required 6 volts with 1 amp of current to activate properly. The Arduino microprocessor could only output 5V at 40 mA, so an external relay acting as a switch was used to allow the Arduino microprocessor to open and close an external circuit for the electromagnet.

Figure 10:
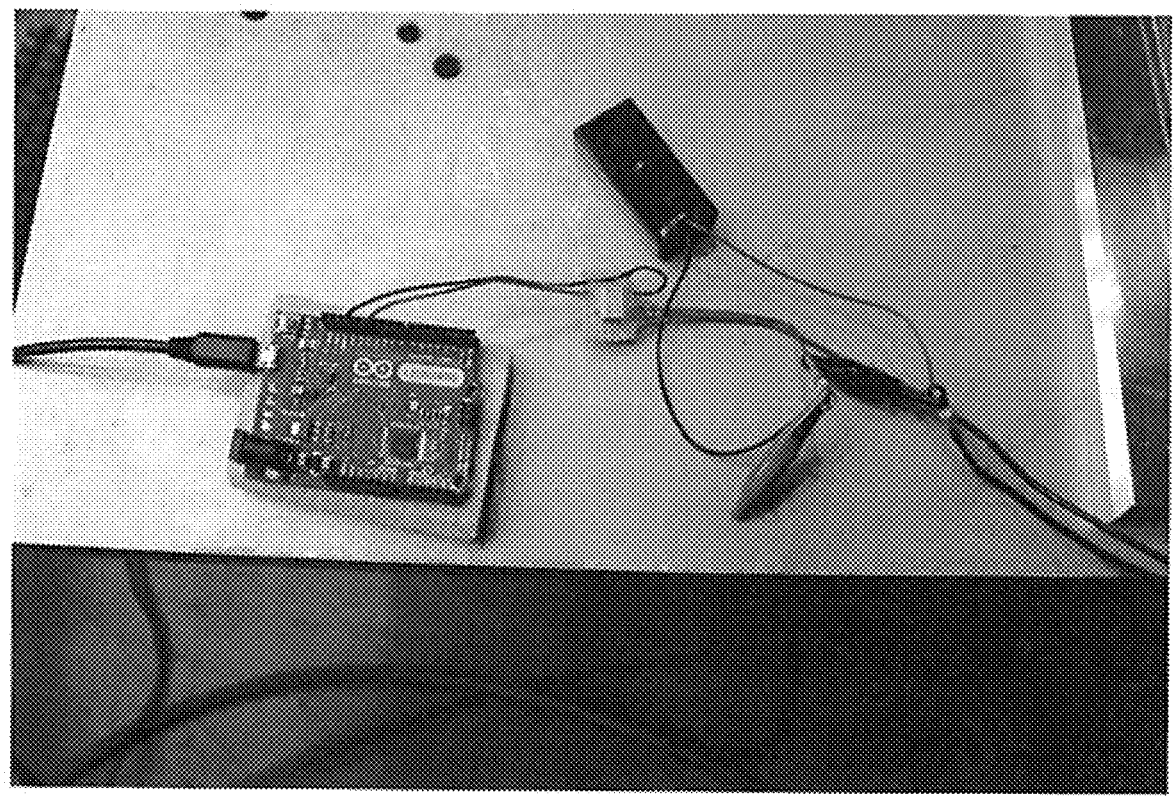
FIG. 10 is a picture of a communication module according to an embodiment.

Each component of the RTI is shown in FIG. 10. The Arduino microprocessor could only take serial commands from a computer, but not the actual KRC, which resulted in significant limitations for the application of this system within the KRL and KRC environment.

Software for Robotic Capture

Figure 11:
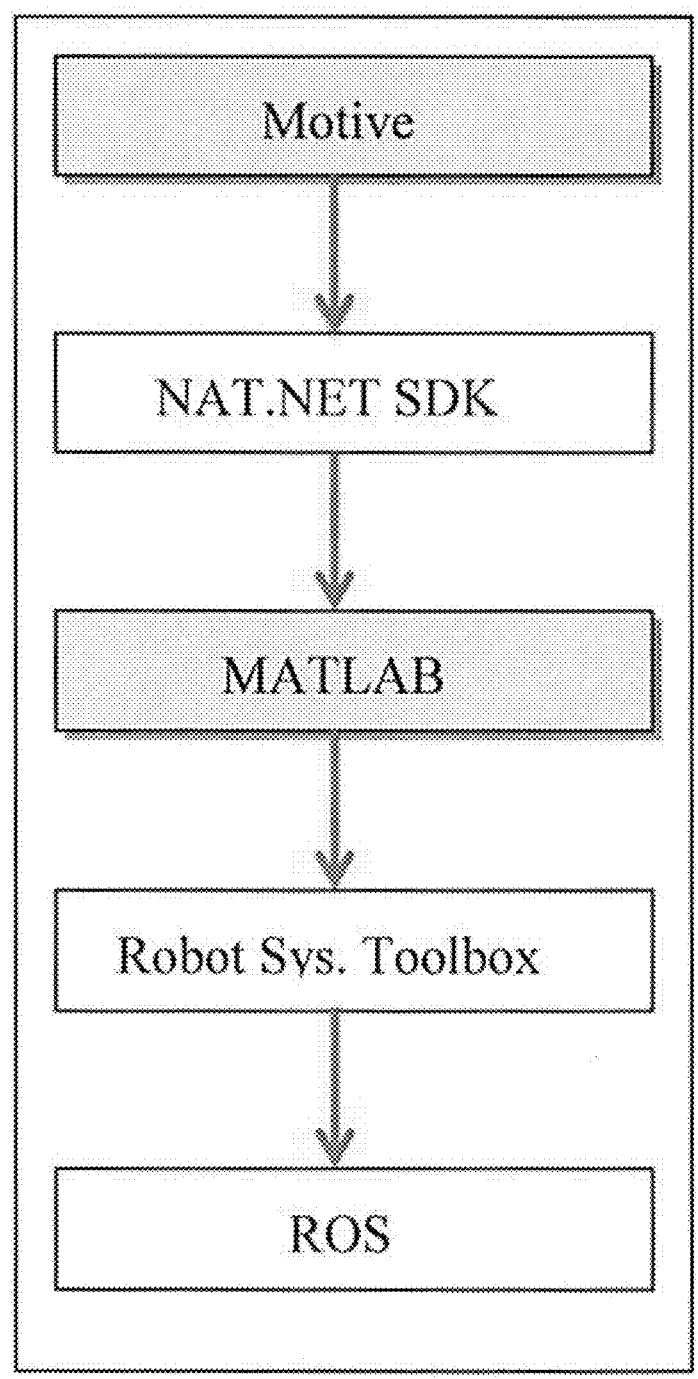
FIG. 11 is a flowchart showing the hierarchy of software communication that is able to perform a robotic UAV capture.

The three main features of a successful robotic capture are data collection, data analysis, and data execution. The process of catching a UAV by means of a moving substrate, preferably a robotic arm, would be impossible without compliance obtained by using live data on the kinematic behavior of the incoming UAV. Data collection refers to the way that kinematic motion data is gathered and is accomplished by a data collection module. Data analysis refers to the computation and processing performed on the collected data in order to construct an effective catch path for the end-effector, which is performed by a data analysis and computation module, or a control module. Data execution refers to the way in which this catch path is communicated to and executed by the robotic arm, and is performed by a communication module. A fully functioning robotic arm UAV capture system requires real-time communication between each of these components. In some embodiments, the motion is determined recursively. There are many combinations of hardware and software capable of handling the processing load and basic functions required to execute these three features of a robotic UAV capture. FIG. 11 shows an exemplary hierarchy of software communication that can be used to perform a robotic UAV capture, using suitable coding and hardware. The two programs that were used in the embodiment described herein are Motive and MATLAB.

The data collection module must be capable of tracking and communicating location data of an incoming UAV. Any motion capture system would be capable of this task. Suitable motion capture systems are typically found in the production industry, and are composed of multiple types of cameras and software. These systems are capable of accurately tracking and recording the motion of tracking points. The motion capture system used in the embodiment discussed herein was the OptiTrack Trio, which employs a three camera setup, which tracks and records motion data using a program called Motive. The OptiTrack Trio is capable of tracking the location of a tracking point to within a fraction of a millimeter at a rate of 120 Hz.

The data analysis and computation module, or in some embodiments the control module requires a program capable of performing mathematical calculations. While virtually any computer language might be capable of performing the calculations, a mathematics program called MATLAB provides good graphical feedback. A MATLAB script was used to perform post-processed data analysis. The communications module can be a Robot Operating System (ROS) used for data execution, upon communication of the path constructed using the MATLAB program to the ROS.

I: Data Collection 1.1: Motive software

Tracking the motion of the UAV is completed by a data collection module. In an embodiment the data collection module may be a motion capture system called the Opti-Track Trio, using the motion capture program Motive. The OptiTrack Trio is accurate to within three tenths of a millimeter. OptiTrack camera systems are commonly used in the field of video special effects. The OptiTrack Trio is able to track any infrared reflective material. Spherical reflective tracking dots are often used in scenarios where the orientation of the object being tracked changes significantly.

1.2: Method of Data Collection

A reflective sphere may be placed on the midsection of the UAV's fuselage. For testing purposes, six trials of gliding flight were collected. The UAV is thrown in the general direction of the Trio. Of the six trials, the first three served as guidance for the algorithm development and the remaining three provided test data for the final MATLAB script. The data is recorded on Motive and then exported as a CSV (comma-separated-variable) file. CSV files are easily read by programming platforms, including MATLAB.

2: Data Analysis

TABLE 2

| | Description |
| --- | --- |
| MATLAB Function Name | |
| polyfit(data1, data2, n) | Polynomial regression of data1 vs. data2 to the $n^{th}$ degree |
| csvread(filename, a, b) | Reads data from CSV file, filename, with row offset (a, b) |
| csvwrite(filename, M) | Writes a CSV file, filename, from data in matrix M |
| fzero(f, g) | Finds zeros of function f with the starting guess g |
| plot(data1, data2) | Plots data1 vs. data 2 |
| saveas(f, filename, filetype) | Saves figure f with a filename filename with a file type filetype |
| Variable Name | |
| cartDat | Raw (x, y, z) data read from the CSV file |
| rotCartDat | Rotated (x, y, z) data |
| pEnter = (tEnter, xEnter, zEnter) | Time and location glider enters work envelope of arm |
| pOver = (tOver, xOver, zOver) | Time and location glider is first directly above arm |
| pCatch = (tCatch, xCatch, zCatch) | Time and location arm catches glider |
| pExit = (tExit, xExit, zExit) | Time and location glider exits work envelope of arm |
| catchRatio | Ratio of the time difference for calculating catch point |
| planeStartPos | Arbitrary start position for the glider |
| armStartPos = (tOver, xArmStart, zArmStart) | Arbitrary start position for the arm's end effector |
| finalArmDat | Final time and location matrix of end-effector path |

2.1: Cartesian Rotation

Once the motion data is obtained, the data analysis and computation module is used to determine the future path of the UAV from the motion data collected by the data collection module. From the analysis the module constructs a trajectory path for the electromagnetic end effector, and can include a start time at which movement of along said constructed trajectory path is initiated. In some embodiments the same analysis may be performed by a control module. The first step in processing the CSV file from Motive is to perform initial processing to project the 3-D Cartesian data (x,y,z) onto the 2-D x-z plane through the use of a 3-D rotation matrix. Raw Cartesian data was read by MATLAB from each CSV file and used to populate a three column matrix called cartDat. The heading of a flight-path is defined by the angle between the x-y direction of motion and the positive x-axis. Finding the heading of the raw data stored in cartDat involves multiple steps. First, the raw data is translated by the negative of the initial position value in the matrix. This translates the dataset to begin at the origin. The heading angle, θ, is then calculated by taking the inverse tangent of the slope of a linear regression on the x-y plane. The cartDat matrix is rotated θ degrees counterclockwise around the z-axis by a 3-D rotation matrix, and then populates a new matrix cartDatRot:

$$[cartDatRot] = \begin{bmatrix} x_0 & y_0 & z_0 \\ \cdot & \cdot & \cdot \\ \cdot & \cdot & \cdot \\ \cdot & \cdot & \cdot \\ x_f & y_f & z_f \end{bmatrix} * \begin{bmatrix} \cos(\theta) & -\sin(\theta) & 0 \\ \sin(\theta) & \cos(\theta) & 0 \\ 0 & 0 & 1 \end{bmatrix}$$

The original row of timestamp values is then concatenated onto cartDatRot. After rotation, the y-values of cartDatRot are negligible, so the y-value row is removed. The cartDatRot matrix gives the behavior of the x and z values of the UAV vs. time.

2.2: Parametric Extrapolation

The second step in analyzing the motion data is to extrapolate the position of the UAV at future timestamps. Due to the fact that the flight path of a UAV is a linear descent, the motion of the UAV is extrapolated by two linear parametric equations, x(t) and z(t). These equations are calculated by performing a polynomial fit between the time-column and xyz-column of cartDatRot. Given these parametric equations, the x-z location of the UAV vs. time can be calculated. The extrapolated data populates a matrix, and translates to start at the point planeStartPos.

2.3: Critical Points Determination

A robotic arm's work envelope is the area in which the arm is able to effectively reach and manipulate. A generalized work envelope of a robotic arm is modeled by a semicircle, radius R, with a center at the origin. Given the equation of the outer edge of the work envelope and the two parametric equations calculated in 2.2, the location and time at which the UAV enters and exits the work envelope are determined with the fzero function. These values are (tEnter, xEnter, zEnter) and (tExit, xExit, zExit). The point of catch is calculated by finding a timestamp value tCatch that is a certain ratio, catchRatio, between tEnter and tExit, given by:

tCatch=tEnte7'+(catch Ratio*(tExit−tEnter))

Figure 12:
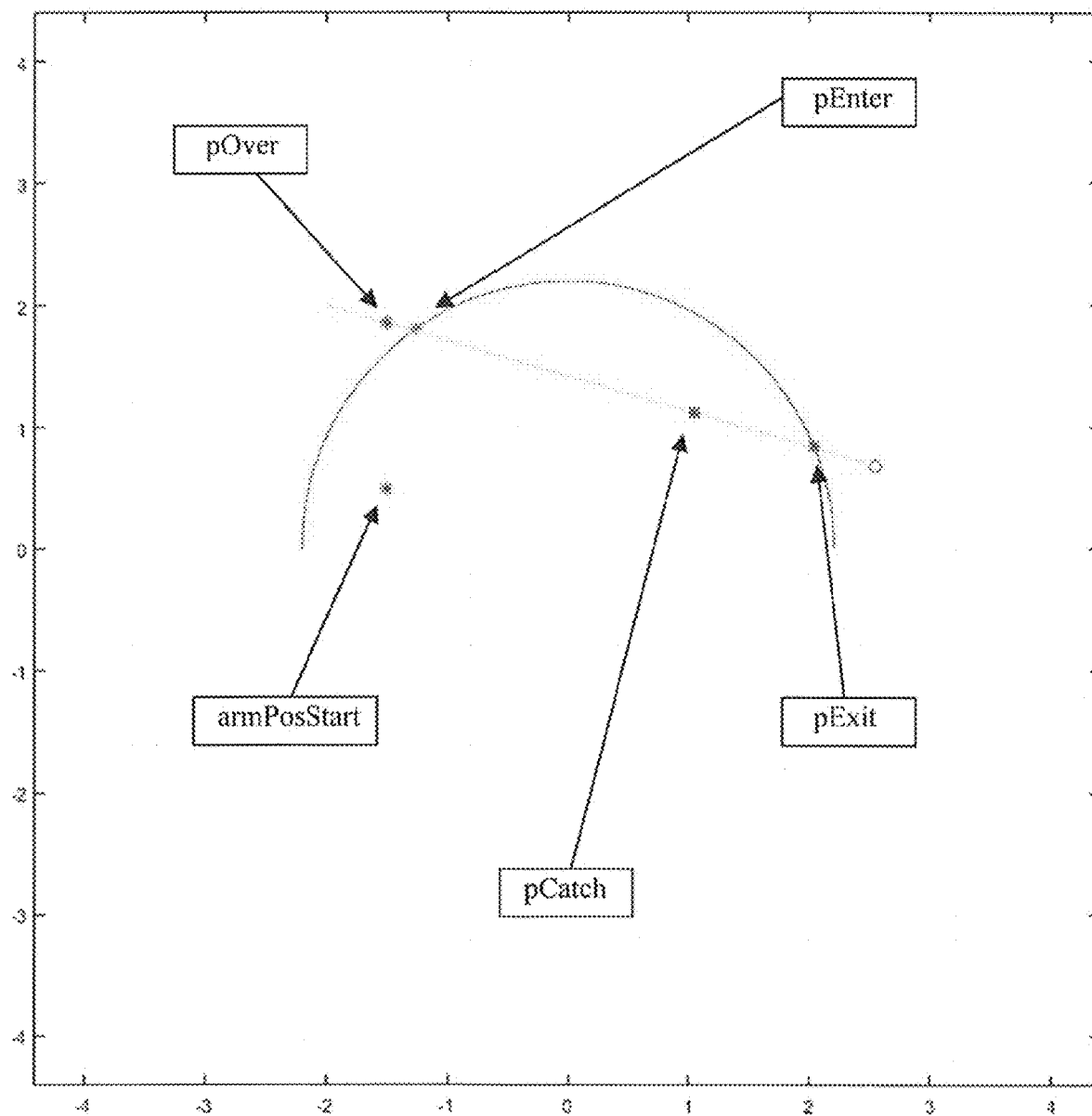
FIG. 12 is a graphic of the extrapolated UAV path, work envelope, enter point, exit point, and catch point.

Given tCatch, xCatch and zCatch are then calculated by plugging tCatch into the parametric equations from 2.2. A diagram of the extrapolated UAV path, work envelope, enter point, exit point, and catch point are displayed in FIG. 12.

2.4: Translated Path-Matching

Figure 13:
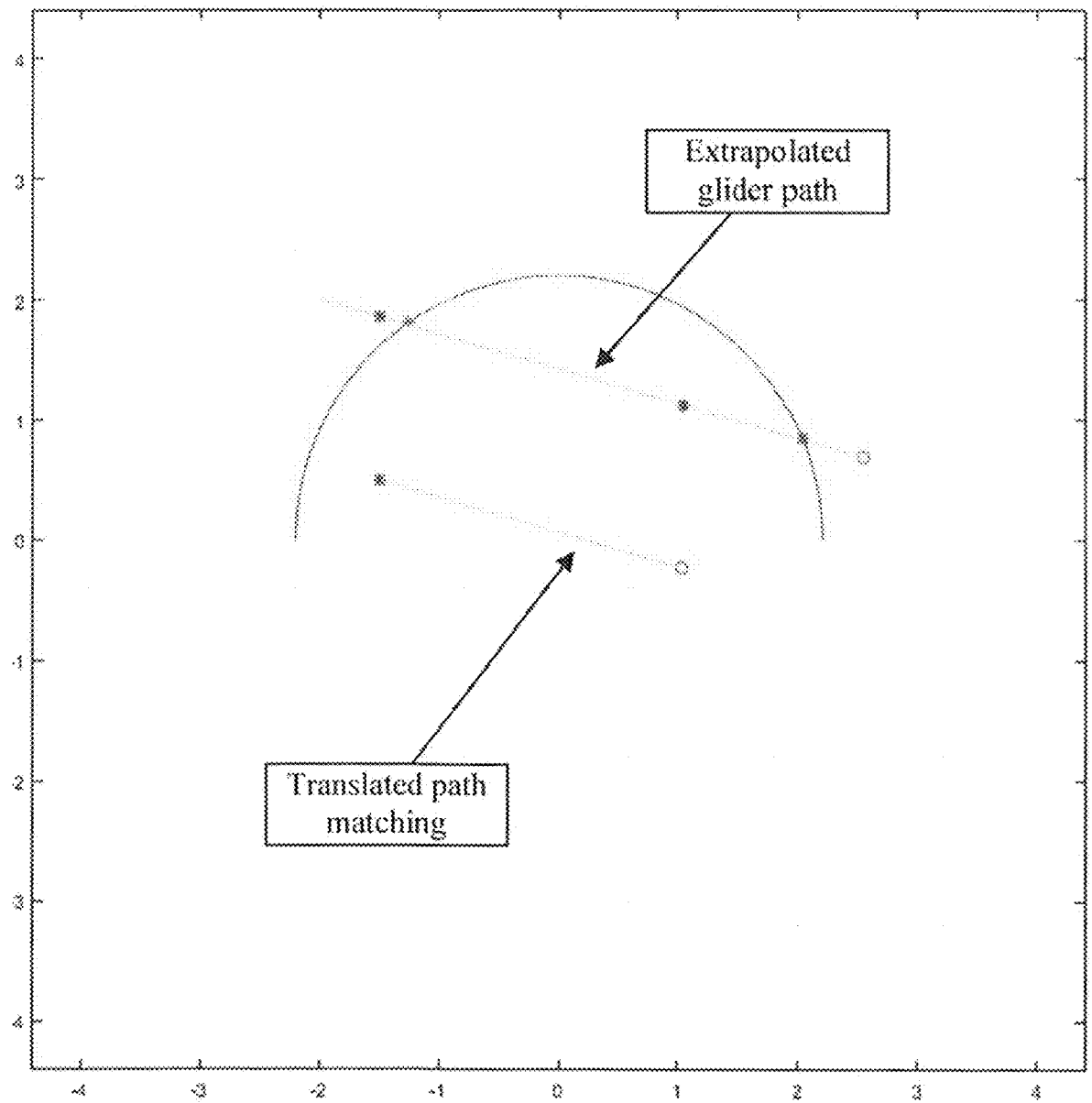
FIG. 13 is a graphic representation of the translated path-matching motion.

After the point and time of catch is calculated, a smooth catch motion path for the end effector of the robotic arm must be determined. This path must smoothly approach the catch point determined in 2.3 and reach the catch point at the timestamp tCatch. An arbitrary start point for the end effector is given by a coordinate within the work envelope, armStartPos. The path planning algorithm constructs this smooth motion path in two parts: translated path-matching and offset-correction, which provides horizontal and vertical motion planning, respectively. Each part constructs two parametric paths, which are added at the end to produce a desired smooth curve. Translated path-matching directly copies the extrapolated UAV motion and translates it to begin at the start point for the arm. The time and location at which the UAV crosses the start position for the arm is given by (tOver, xOver, zOver). The timestamp column of the translated motion data is shifted by tOver to accurately represent the arm's position relative to the plane. A graphic of the translated path-matching motion is shown in FIG. 13.

2.5: Offset-Correction

If the translated path-matching motion calculated in 2.4 was executed by itself, the displacement between the UAV and the arm would remain constant. Therefore, in order to catch the UAV, this displacement between the UAV and the arm must be decreased to zero between the timestamps tOver and tCatch. Given that the translated path-matching motion from 2.4 is linear, and the end goal is a smooth parametric path, the offset-correction must be decreased smoothly. The goal of the offset correction function is to decrease the initial displacement, given by (zOver−zArmStart), smoothly to zero between the timestamps tOver and tCatch. The parametric function zCurve defines a parabola with a t-intercept of (t,z)=(tOver, 0), and a maximum at (tCatch, (zOver,zArmStart)). zCurve is given by the equation:

$$zCurve = -[zOver - zArmStart]\left[\frac{(t - tCatch)^2}{(tOver - tCatch)^2} - 1\right]$$

Given the translated path-matching motion defined in 2.4 and the offset-correction motion defined by zCurve in 2.5, the desired smooth catch curve can be calculated by adding these two paths. By adding the path-match and zCurve, a path is created that starts at armStartPos and smoothly approaches the catch point, and finally reaches the catch point at the proper catch time.

3: Data Execution 3.1: Arm Reference Frame

Given the smooth path constructed at the end of 2.5, a three column matrix, finalArmDat, is populated, which gives the desired location vs. time data for the end effector. The coordinates along the path given by finalArmDat are, in respect to the origin, defined by the center of the arm's work envelope. This means that the motion data is in respect to the arm's reference frame, which is required for a robotic arm path.

3.2: CSV Export

The data in finalArmDat is written into a new CSV file through the function csvwrite. The CSV file includes timestamps that correspond with end-effector coordinates. CSV files can be read by robot control software such as a Robot Operating System (ROS), which can act as the communication module to effectuate the movement of the robot arm.

Results

Figure 14:
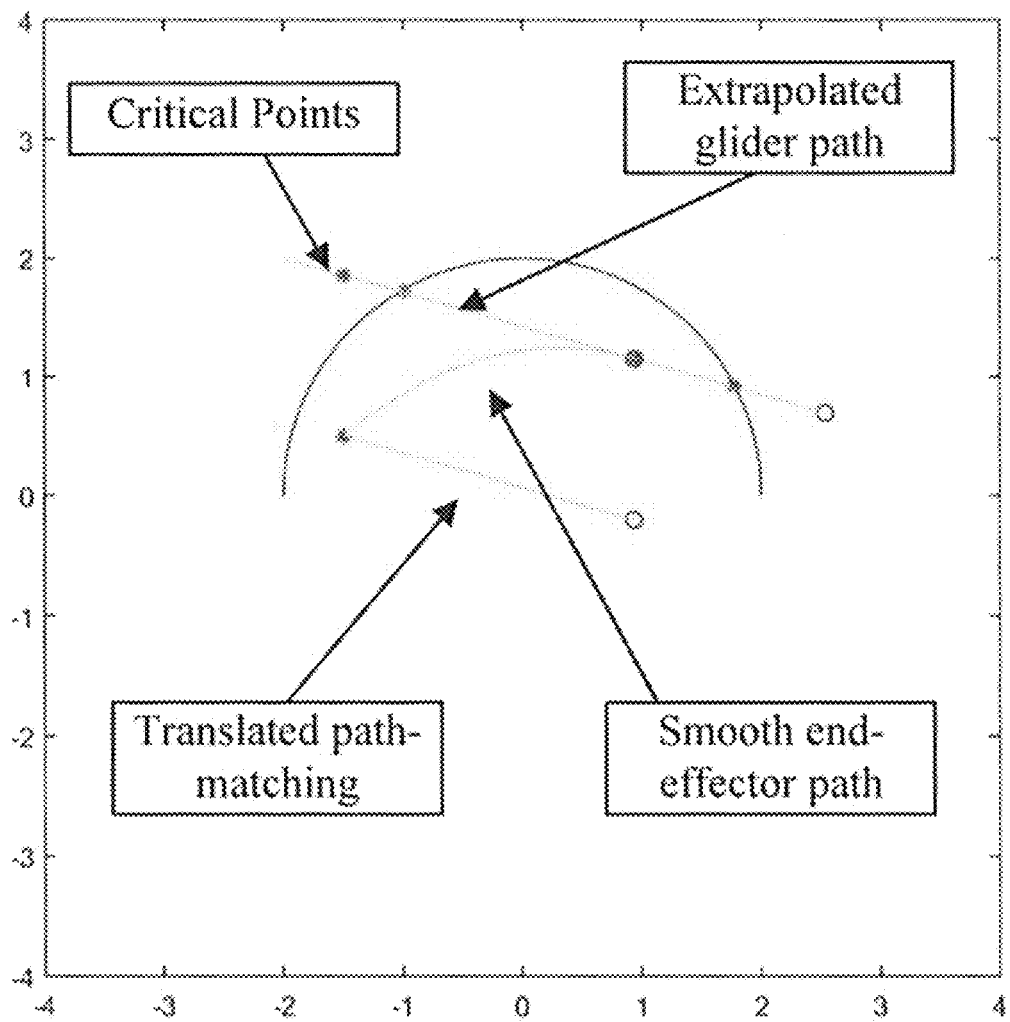
FIG. 14 is a graphic representation of a smooth end-effector catch path.

For data collection, the OptiTrack Trio camera system effectively and accurately recorded the position and motion of the UAV, and can output CSV files that are readable by MATLAB. For data analysis, the MATLAB script executes the five algorithm steps: Cartesian-rotation, parametric extrapolation, critical points determination, translated path-matching, and offset-correction. When working in unison, each step of the path planning script is able to calculate a smooth end-effector catch path as shown in FIG. 14. The MATLAB script was able to successfully perform simulated catches for the first three trials of CSV motion data, as well as the last three unique trials. Testing the path planning script with the last three files demonstrated the algorithm's level of usability with raw data. Overall, the path planning algorithm proved to be successful in constructing and exporting a smooth end-effector catch path by post-processing raw motion data of motion of a UAV.

Adapting the software discussed above to run in real-time required the use of the other programs in FIG. 11: NAT.NET SDK for live Motive to MATLAB communication and Robot System Toolbox/Robot Operating System for MATLAB to robot communication.

Although the above robotic launch and/or capture system is described as a single system, it is understood that the launch system can be a separate system from the capture system, and that each system can be used individually to either launch or capture a UAV. Further any element of the system that has been described individually can also be used in a combined launch and/or capture system.

The robotic launch and/or capture system described herein can be used in a method of launching an UAV provided with a metallic strike plate. The UAV is secured on the electromagnetic end effector by activating the electromagnet to create an electromagnetic field. Data is input to a control module of the system regarding the launch velocity and angle needed for the UAV to successfully launch. The control module and trajectory software are used to calculate a trajectory path for the electromagnetic end effector, as described in the trajectory software section above, and the Example herein. The control module communicates the desired location of the free end of the robotic arm based on the trajectory path through the use of a communication module, and the electromagnet of the electromagnetic end effector is deactivated to launch the UAV when the UAV has reached the desired velocity and angle for launch. The trajectory path can be a determined point-to-point trajectory path, and the point-to-point trajectory path may use a reference point. A start time for the movement of the arm at which time movement of said end effector along said constructed trajectory path is initiated may also be controlled by the control module.

The robotic launch and/or capture system described herein can also be used in a method of capturing an UAV provided with a metallic strike plate. The UAV is directed on a path that intersects a work envelope of a robotic arm comprising a free end and a secured end, and an electromagnetic end effector located proximate to the free end of the robotic arm. Motion data for the UAV is obtained and the location of the free end of the robotic arm is controlled based on the motion data to position the electromagnetic end effector for interaction with the metallic strike plate of the UAV when the UAV is present within the work envelope of the robotic arm to capture the UAV.

The location of the free end of the robotic arm for controlling its position is accomplished by determining a future path of the UAV from the motion data and constructing a trajectory path for the end effector using the future path of the UAV. The trajectory path can be determined by using the data analysis and computation discussed above in Section 2. Such a trajectory path can be a point-to-point trajectory path, and the point-to-point trajectory path may have a reference point. A start time for the movement of the arm at which movement of said end effector along said constructed trajectory path is initiated may also be determined based on the obtained motion data.

EXAMPLES

Example 1

To analyze the kinematic characteristics of each throw trajectory plan as described above, a KRC oscilloscope was used to collect data. The two variables C and V were recorded using the oscilloscope throughout the duration of each program. C and V state the angle of elevation of the UAV and the velocity of the UAV, respectively. The three programs that were analyzed were the three programed trajectory paths: Linear, PTP (no reference point), and PTP (with reference point). Each trajectory was run at full speed, with the magnetic grip end effector and a UAV attached thereto using a metallic strike plate.

Figure 15:
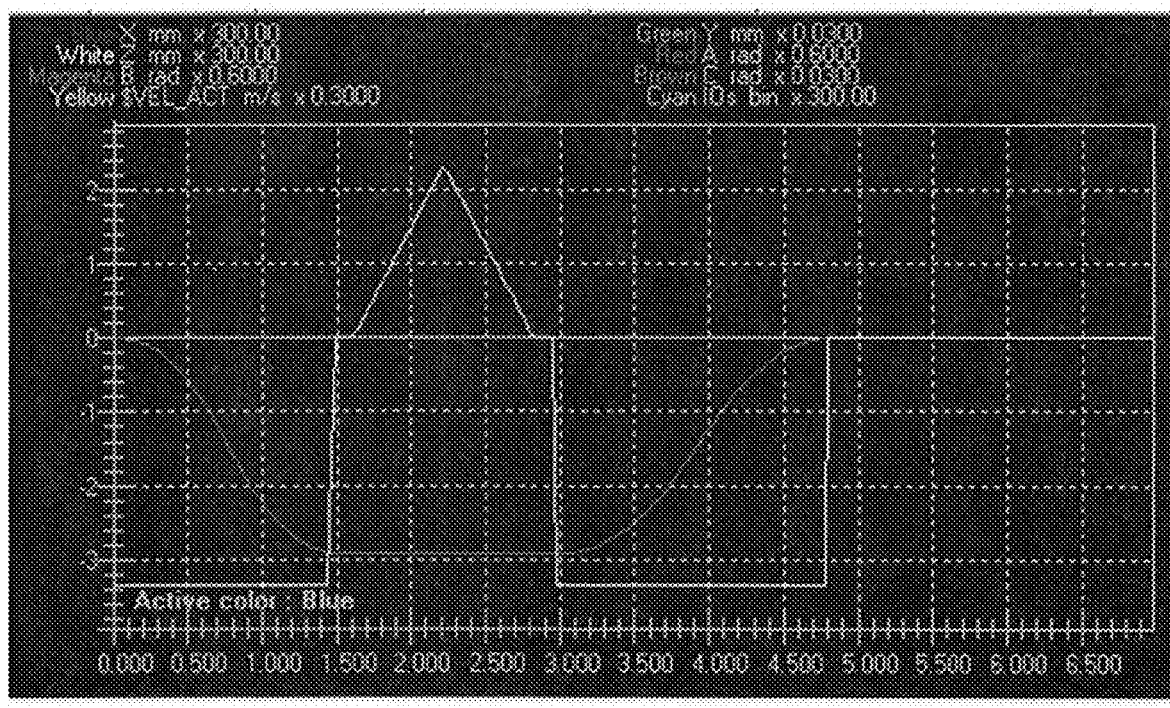
FIG. 15 is a display of oscilloscope data from the KRC for the trajectory shown in FIG. 7.
Figure 16:
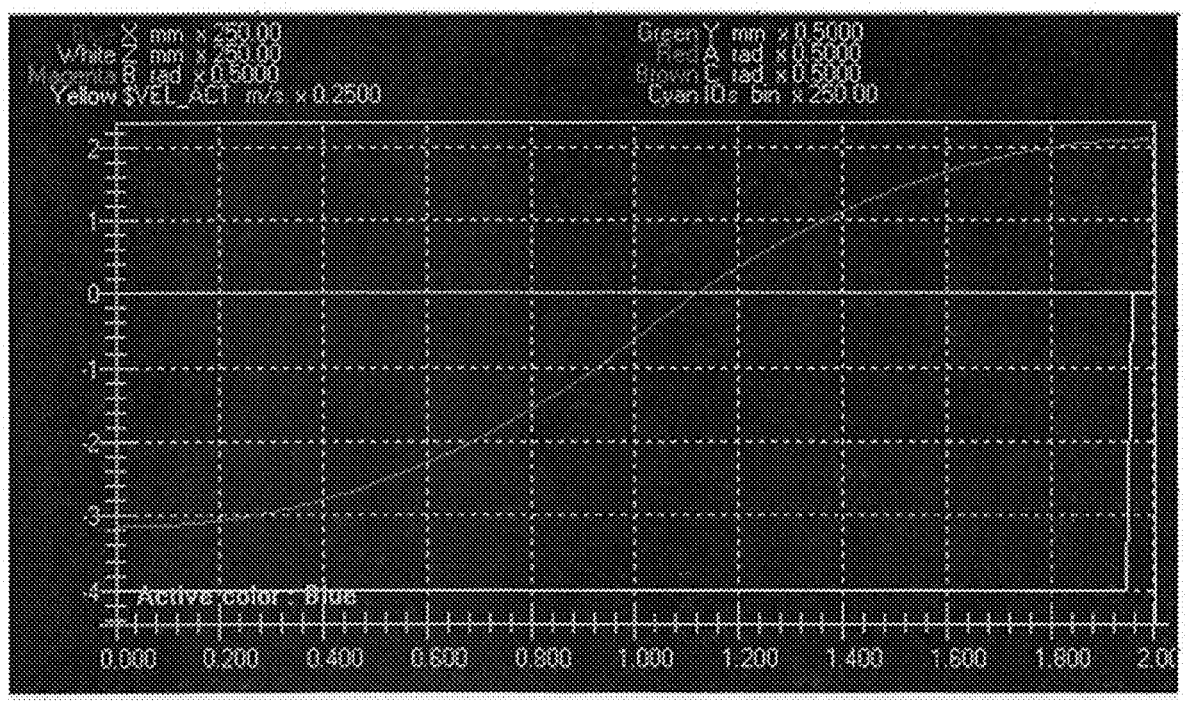
FIG. 16 is a display of oscilloscope data from the KRC for the trajectory shown in FIG. 8.
Figure 17:
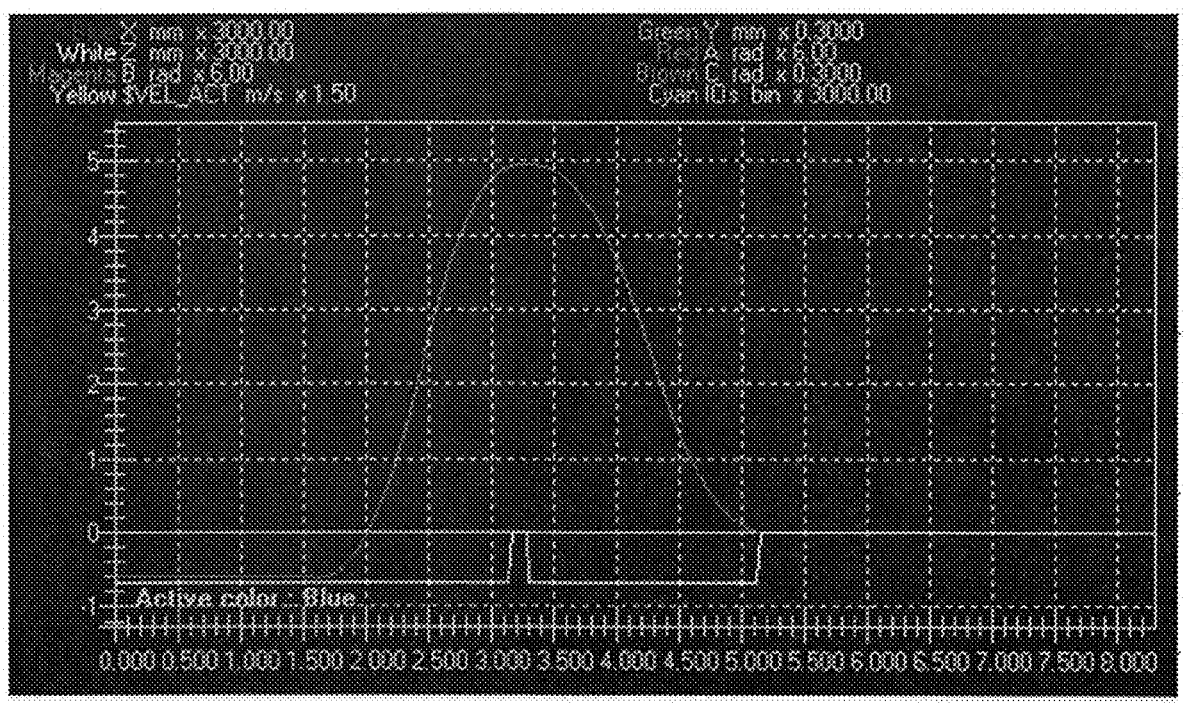
FIG. 17 is a display of oscilloscope data from the KRC for the trajectory shown in FIG. 9.

FIGS. 15, 16 and 17 display the oscilloscope data from the KRC for each of the three trajectory programs. The yellow line on each of the graphs represents the V value for the end effector, or the velocity vs. time. The brown line represents the C value for the end effector, or the angle of elevation vs. time. The launch time interval for each respective graph is the following: Linear (FIG. 15), 1.5-3.0 sec; PTP w/o Reference Point (FIG. 16), 0-2.0 sec; PTP w/Reference Point (FIG. 17), 0-3.0 sec.

Certain trend types are evident across all three of the oscilloscope graphs. Based on the objective of the throw trajectory software, having a period of time that has a high velocity, a constant C value, and a constant V value is desired. The terms "velocity plateau" and "C plateau" represent periods of motion where either velocity is constant or C is constant during the launch time interval. Having a period of constant velocity or constant C is desired during a trajectory motion because it allows the UAV to be released with a more accurate launch angle and velocity. Table 3 below states the maximum velocity for each trajectory path type, as well as the existence of a velocity plateau or C plateau for each motion.

TABLE 3

| Trajectory Path Type | Maximum Velocity | Velocity Plateau (Y/N) | C Plateau (Y/N) |
| --- | --- | --- | --- |
| Linear | 0.675 m/s | N | Y |
| PTP w/o Ref. | 1.0 m/s | Y | N |
| PTP w/Ref. | 1.0 m/s | Y | Y |

The electromagnetic end effector proved to be an effective apparatus for strongly holding and instantaneously and reliably releasing the UAV. Once a signal was sent to the electromagnetic end effector, the electromagnet instantly turned off, and the holding force between the end effector and the UAV was removed. When running the electromagnetic end effector at 9V, a small amount of residual electromagnetic force existed between the end effector and the strike plate on the UAV. When running the end effector at 6V, no significant residual electromagnetic force existed after the electromagnet was turned off. The fuselage rails were effective for aligning the body of the UAV during the placement of the UAV on the end effector and during launch.

Certain kinematic characteristics for each of the three trajectory programs were collected. Table 3 shows these kinematic characteristics for each of the three trajectories. Of the three paths, both PTP paths had larger overall velocities than the Linear path. Both PTP paths had periods of constant velocity. The Linear path and the PTP w/Ref path had periods of constant angle of elevation. Based on the collected data, the PTP w/Ref path reaches a max speed of 1 m/s, and has periods of both constant velocity and constant angle of elevation during its launch time interval.

The electromagnetic end effector system consisted of three parts: The electromagnetic end effector apparatus, the trajectory software, and the RTI. Based on the performance of the end effector apparatus, it can be concluded that an electromagnetic end effector is a viable option for robotic arm UAV launch. The analysis pertaining to the KRC throw trajectory paths leads to the conclusion that the PTP w/Reference Point is the most optimal trajectory path, because it reaches the highest velocity of 1 m/s and has periods of constant velocity and angle of elevation.

At numerous places throughout this specification, reference has been made to a number of U.S. Patents and other documents. All such cited documents are expressly incorporated in full into this disclosure as if fully set forth herein.

Other embodiments of the present disclosure will be apparent to those skilled in the art from consideration of the specification and practice of the embodiments disclosed herein. As used throughout the specification and claims, "a" and/or "an" may refer to one or more than one. Unless otherwise indicated, all numbers expressing properties used in the specification and claims are to be understood as being modified in all instances by the term "about," whether or not the term "about" is present. Accordingly, unless indicated to the contrary, the numerical parameters set forth in the specification and claims are approximations that may vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements. It is intended that the specification and examples be considered as exemplary only, with a true scope and spirit of the disclosure being indicated by the following claims.

The foregoing embodiments are susceptible to considerable variation in practice. Accordingly, the embodiments are not intended to be limited to the specific exemplifications set forth herein above. Rather, the foregoing embodiments are within the spirit and scope of the appended claims, including the equivalents thereof available as a matter of law.

The applicant does not intend to dedicate any disclosed embodiments to the public, and to the extent any disclosed modifications or alterations may not literally fall within the scope of the claims, they are considered to be part hereof under the doctrine of equivalents.

What is claimed is:

1. An apparatus for capturing an unmanned aerial vehicle comprising:
   a moving substrate;
   an electromagnetic end effector connected to the moving substrate;
   a metallic strike plate located on the unmanned aerial vehicle and configured to be attracted and securely held to the electromagnetic end effector when the electromagnetic end effector is activated;
   a data collection module for collection of motion data of the unmanned aerial vehicle;
   a data analysis and computation module for determining a future path of the UAV from the motion data collected by the data collection module and constructing a trajectory path for the electromagnetic end effector using said future path of the UAV; and
   a communication module for communicating said constructed trajectory path to the robotic arm for execution,
   wherein the data analysis and computation module constructs a point-to-point trajectory path.

2. The apparatus of claim 1, wherein the moving substrate is configured to provide a desired orientation and velocity of the electromagnetic end effector.

3. The apparatus of claim 1, wherein the moving substrate is a robotic arm.

4. The apparatus of claim 1, wherein the point-to-point trajectory path is a point-to-point trajectory path with a reference point.

5. The apparatus of claim 1, wherein the constructed trajectory path includes a start time at which movement along said constructed trajectory path is initiated.

6. A system for launching and/or capturing an unmanned aerial vehicle comprising:
   a movable robotic arm having a free end and a secured end;
   an electromagnetic end effector connected proximate to the free end of the robotic arm;
   a metallic strike plate located on the unmanned aerial vehicle to be attracted and securely held to the electromagnetic end effector when the electromagnetic end effector is active;
   trajectory software configured to control a location of the free end of the robotic arm; and
   a control module for receiving input data, analyzing the data and using the trajectory software to control the location of the free end of the robotic arm and activate or deactivate the electromagnetic end effector,
   wherein the electromagnetic end effector further comprises at least one aligning rail positioned and configured for aligning the unmanned aerial vehicle in a particular orientation relative to the electromagnetic end effector.

7. The system of claim 6, further comprising:
   a data collection module for collection of motion data of the unmanned aerial vehicle and communicating said motion data to said control module.

8. The system of claim 7, wherein the control module determines a future path of the UAV from the motion data collected by the data collection module and constructs a trajectory path for the electromagnetic end effector using said future path of the UAV, and
   a communication module for communicating said constructed trajectory path to the robotic arm for execution.

9. The system of claim 8, wherein the control module constructs a point-to-point trajectory path.

10. The system of claim 9, wherein the point-to-point trajectory path is a point-to-point trajectory path with a reference point.

11. The system of claim 8, wherein the constructed trajectory path includes a start time at which movement of said end effector along said constructed trajectory path is initiated.

12. The system of claim 6 further comprising an actuator configured for activating and deactivating an electromagnet of the electromagnetic end effector and wherein the control module is configured to cause the actuator to deactivate the electromagnet at a launch time when said UAV has achieved a sufficient velocity and is positioned at suitable launch angle.

13. A method of capturing an unmanned aerial vehicle provided with a metallic strike plate, said method comprising steps of:
   a. directing the unmanned aerial vehicle on a path that intersects a work envelope of a robotic arm comprising a free end and a secured end, and an electromagnetic end effector located proximate to the free end of the robotic arm,
b. obtaining motion data for the unmanned aerial vehicle, and
c. controlling a location of the free end of the robotic arm based on the motion data to position the electromagnetic end effector for interaction with the metallic strike plate of the unmanned aerial vehicle when the unmanned aerial vehicle is present within the work envelope of the robotic arm to capture the unmanned aerial vehicle,
wherein said step of controlling a location of the free end of the robotic arm comprises a step of determining a future path of the UAV from the motion data,
wherein said step of controlling a location of the free end of the robotic arm comprises a step of constructing a trajectory path for the end effector using the future path of the UAV,
wherein the trajectory path is a point-to-point trajectory path.

14. The method of claim 1, wherein the point-to-point trajectory path is a point-to-point trajectory path with a reference point and the constructed trajectory path includes a start time at which movement of said end effector along said constructed trajectory path is initiated.

\* \* \* \* \*